United States Patent [19]

Jäger

[11] Patent Number: 4,629,788
[45] Date of Patent: Dec. 16, 1986

[54] TRIPHENDIOXAZINE REACTIVE DYESTUFFS

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 652,784

[22] Filed: Sep. 20, 1984

[30] Foreign Application Priority Data

Oct. 11, 1983 [DE] Fed. Rep. of Germany ....... 3336844
Dec. 7, 1983 [DE] Fed. Rep. of Germany ....... 3344253
Feb. 11, 1984 [DE] Fed. Rep. of Germany ....... 3404855

[51] Int. Cl.$^4$ .................. C09B 19/00; C09B 19/02
[52] U.S. Cl. .................................. 544/76; 544/74; 544/75
[58] Field of Search ................... 544/74, 75, 76

[56] References Cited

U.S. PATENT DOCUMENTS 3,996,221 12/1976 Leng et al. ............. 544/75 X
4,092,478 5/1978 Plant et al. ............. 544/76
4,315,865 2/1982 Hoyer et al. ............ 260/373
4,336,377 6/1982 Adam et al. ............. 544/74
4,400,504 8/1983 Harms et al. ........... 544/76
4,472,575 9/1984 Renfrew ................. 544/76

FOREIGN PATENT DOCUMENTS 1292272 4/1969 Fed. Rep. of Germany .
1085256 9/1967 United Kingdom .
1559752 1/1980 United Kingdom .

Primary Examiner—Richard L. Raymond
Attorney, Agent, or Firm—Sprung Horn Kramer & Woods

[57] ABSTRACT

Dyestuffs of the formula

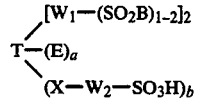

where the substituents are defined as in the descriptive part are highly suitable for dyeing and printing hydroxyl- or amide-containing materials. They produce bright dyeings and prints having good fastness properties.

10 Claims, No Drawings

TRIPHENDIOXAZINE REACTIVE DYESTUFFS

The present invention relates to new triphendioxazine dyestuffs which contain reactive groups and have the general formula $$T \begin{matrix} \nearrow [W_1-(SO_2B)_{1-2}]_2 \\ -(E)_a \\ \searrow (X-W_2-SO_3H)_b \end{matrix} \quad (1)$$

wherein

T is (1a)

[structure: benzene rings D fused to central dioxazine with $T_1$, $T_2$]

or

T is (1b)

[structure: naphthalene rings fused to central dioxazine with $T_1$, $T_2$]

where
$T_1$ and $T_2$ are each H, Cl, Br, F, $C_1-C_4$-alkoxy, $C_1-C_4$-alkyl, optionally substituted phenyl or phenoxy, preferably Cl, and wherein
the benzene rings D and the naphthalene rings can be further substituted, and wherein
B is $SO_2CH=CH_2$ or $SO_2CH_2CH_2Z$
wherein
Z is a detachable group such as $OSO_3H$, $Cl$, $S_2O_3H$, $O\overset{\parallel}{C}CH_3$, $OPO_3H_2$, $-\overset{\oplus}{N}(CH_3)_3$, preferably $OSO_3H$, E is $SO_3H$, COOH or an optionally substituted sulphonamide group,
$W_1$ is a direct bond or a bridge member which is free of heterocyclic groups and is bonded to an aromatically carbocyclic C atom in T, $SO_2B$ being bonded to a C atom in $W_1$ or, if $W_1$ is a direct bond, to an aromatically carbocyclic C atom in T, X is O, NR or S where
R is H or optionally substituted $C_1-C_4$-alkyl,
$W_2$ is an aliphatic, araliphatic or aromatically carbocyclic bridge member,
a is 0 to 2,
b is 0 to 2, a+b being 0 or 2, wherein if a+b=0 $W_1$ has at least one anionic group conferring water-solubility, in particular a sulpho group or 2 $SO_2B$ groups are bonded to $W_1$,
and wherein, if E is $SO_3H$ and a is 2, $W_1$ represents $W_3$, $W_3$ being $-X-Y-X_1-$[A]

wherein
X is as defined above,
Y is a direct bond or $C_1-C_6$-alkylene which is optionally substituted and/or optionally interrupted by hetero atoms,
$X_1$ is a direct bond, O or NR, preferably NH, and
the benzene or naphthalene nucleus A can be substituted or $-X-Y_1-$ \quad (1d)

wherein
X is as defined above and
$Y_1$ is $C_2-C_6$-alkylene which is optionally interrupted by hetero atoms.

Suitable $W_1$ radicals, in addition to those mentioned for $W_3$, are for example as follows:

$-X-$aralkylene$-$ \quad (1f)

wherein
X is as defined above and
aralkylene represents optionally further-substituted $C_1-C_6$-alkylenephenylene, phenylene-$C_1-C_6$-alkylene, $C_1-C_6$-alkylenenaphthylene or naphthylene-$C_1-C_6$-alkylene, or (1g)

$-SO_2-\underset{R}{N}-$[G]$(SO_3H)_{0 \text{ or } 1}$ or $-SO_2-\underset{R}{N}-C_2-C_4\text{Alkylene}-$ wherein
R is as defined above and
the benzene or naphthalene nucleus G can be substituted.

Preferred radicals $W_3$ are $-X-$[naphthalene with $SO_3H$]

radicals.

The optionally substituted sulphonamide radical E in the formula (1) preferably contains water-solubilising groups such as $SO_3H$ or COOH.

E represents in particular the following groupings $E_1$:
(a) A radical of the formula

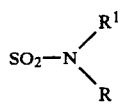

where
R' is $C_2-C_6$-alkylene(O)$_{0\ or\ 1}$ —SO$_3$H and
R is as defined above.
(b) A radical of the formula SO$_2$—NH—SO$_2$R$_1$
where
R$_1$ represents optionally substituted alkyl (preferably CH$_3$) or optionally substituted aryl (in particular phenyl),
(c) A radical of the formula

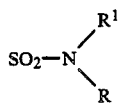

where
R'$_1$ is an aromatic radical having at least one SO$_3$H group, preferably a phenyl radical having 1 or 2 SO$_3$H groups.

Examples of optionally substituted R are CH$_3$, C$_2$H$_5$, n-C$_3$H$_7$ and n-C$_4$H$_9$, all of which can be substituted by OH, OCH$_3$, COOH and SO$_3$H.

Substituents of the optionally substituted phenyl and phenoxy radicals T$_1$ and T$_2$ are for example, Cl, CH$_3$, C$_2$H$_5$, OCH$_3$ and OC$_2$H$_5$.

Examples of substituents of benzene rings D and the naphthalalene rings in formulae (1a) and (1b) respectively are Cl, Br, CH$_3$, C$_2$H$_5$, CH$_3$O, C$_2$H$_5$O and COOH.

Examples of substituents of the benzene and naphthalene rings A and G respectively are Cl, Br, CH$_3$, OCH$_3$, COOH, SO$_3$H, SO$_2$NHCH$_3$, SO$_2$NH$_2$, OC$_2$H$_5$ and C$_2$H$_5$.

In formula (1a) the substituent —W$_1$—(SO$_2$B)$_{1-2}$ is preferably in the o-position relative to one of the two substituents E or —X—W$_2$—SO$_3$H.

Preferred dyestuffs (1) have the formulae (2) to (5b):

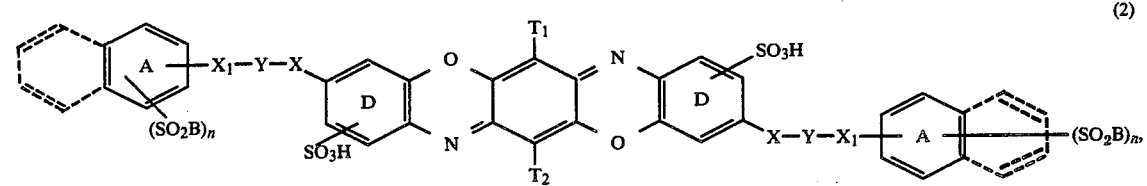

(2)

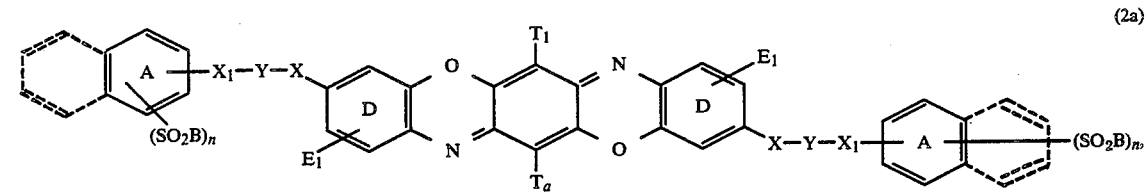

(2a)

wherein
X, Y, X$_1$, T$_1$, T$_2$, A, B and E$_1$ are as defined above
and wherein
the sulpho group in the formula (2) and the radical E$_1$ in the formula (2a) are in the o-position relative to the substituent

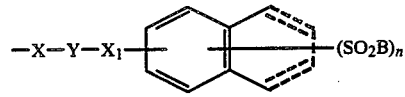

and wherein
the nucleus D can be substituted by Cl, CH$_3$, OCH$_3$ or COOH and
n is 1 or 2;

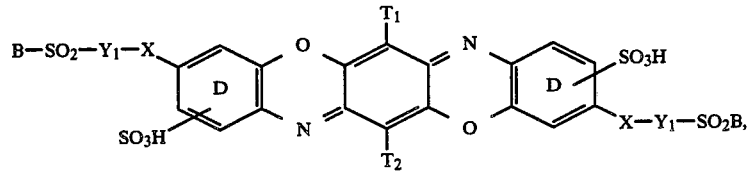

(3)

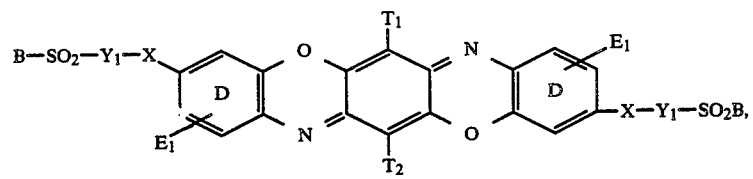

(3a)

wherein
X, B, $T_1$, $T_2$, D and $E_1$ are as defined above and
$Y_1$ is $C_2$-$C_6$-alkylene which is optionally interrupted by hetero atoms
and wherein
the sulpho group in the formula (3) and the radical $E_1$ in the formula (3a) are in the o-position relative to the substituent —X—$Y_1$—$SO_2$B;

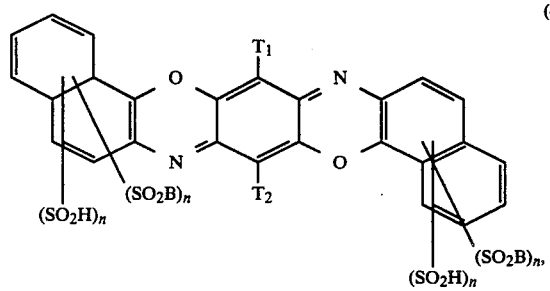
(4)

wherein
n, B, $T_1$ and $T_2$ are as defined above;

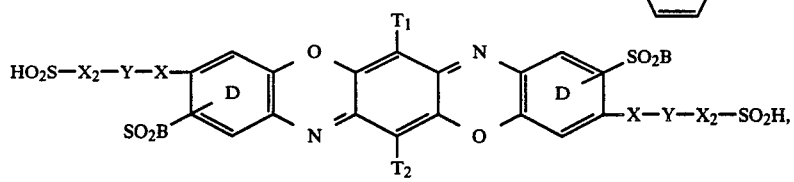

wherein
$X_2$ is a direct bond, an arylene radical (preferably phenylene) which is substituted for example by $SO_3H$, Cl, $OCH_3$, $CH_3$, $C_2H_5$, COOH or $NH_2$, or an araliphatic radical,
the $SO_2B$ group is in the o-position relative to the substituent —X—Y—$X_2$—$SO_3H$ and
X, Y, B, $T_1$, $T_2$ and D are as defined above;

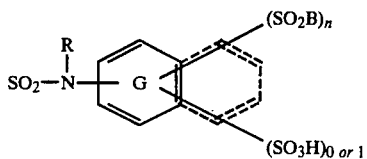

in the formula (5a) and the radical

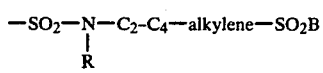

in the formula (5b) are in the o-position relative to the substituent —X—Y—$X_2$—$SO_3H$.

Examples of suitable araliphatic radicals are phenylalkylene radicals whose alkylene chain can be interrupted by hetero atoms or by groups containing hetero atoms, such as

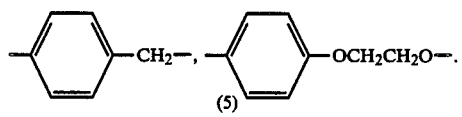
(5)

$C_1$-$C_6$-Alkylene Y is preferably substituted by COOH, $SO_3H$, halogen or optionally $SO_3H$-substituted phenyl. Interrupting hetero atoms are preferably O, S and N.

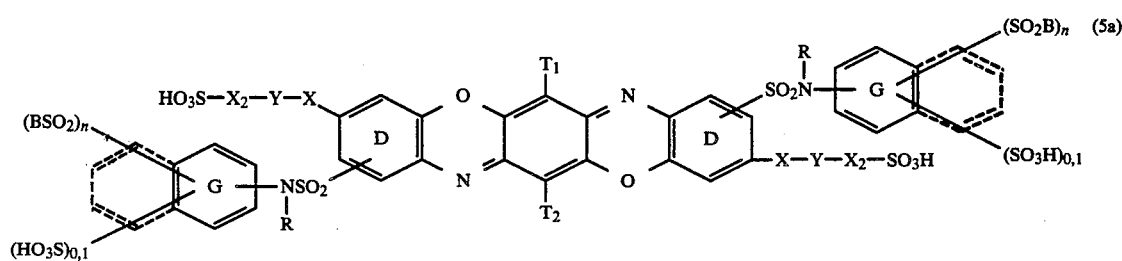
(5a)

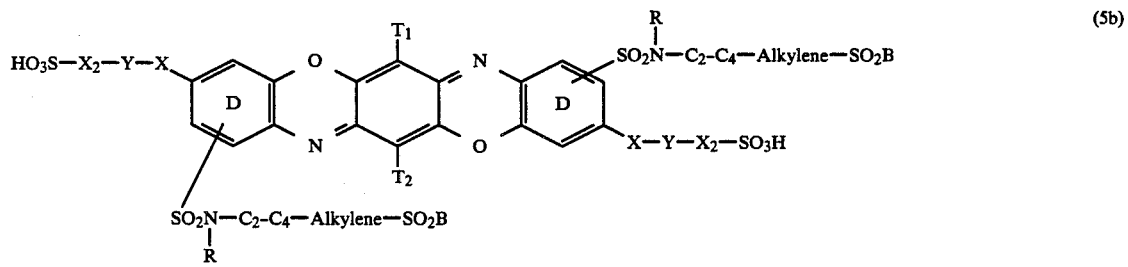
(5b)

wherein
n, B, $T_1$, $T_2$, X, Y, $X_2$, D and G are as defined above
and wherein
the radical $-(CH_2)_2-$, $-CH_2-\overset{|}{C}H-CH_2$, $-CH_2-\overset{|}{C}H-C_2H_5$, -continued

—CH₂—CH—CH₂—, —CH—(CH₂)₄—, (with phenyl-SO₂H substituent on first; COOH on second)

—CH₂—CH₂—S—CH₂—CH₂—,

—CH₂—CH₂—O—CH₂—CH₂—

—CH₂—CH₂—N—CH₂—CH₂—
            |
            COCH₂

The invention also provides dyestuffs of the formula

-continued

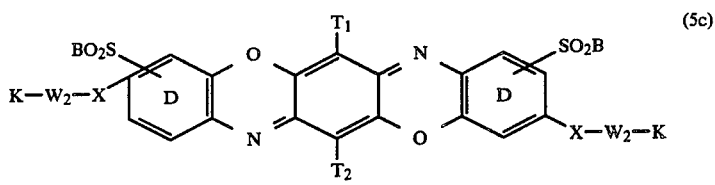

(5c)

wherein
X, W₂, T₁, T₂ and B are as defined above and
K is COOH or —SO₂NH—SO₂R₁, wherein R₁ is as defined above,
and wherein
the group —SO₂B is in the o-position relative to the group —X—W₂—K.

In the formulae (1) to (5c), the following groupings have a preferred meaning:
(1), (2) to (5c): B=CH₂CH₂OSO₃H
(2) to (5c): T₁, T₂=Cl
(2) to (3a), (5) to (5c): X=NH, D is unsubstituted
(2) and (2a): X₁=direct bond Y=direct bond or —CH₂—, —CH₂—CH₂— the radical

preferably represents

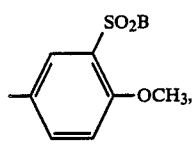 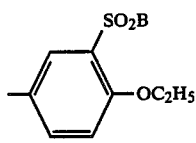

(3), (3a): Y₁=—CH₂—CH₂—
(5), (5a), (5b): X₂=direct bond and Y=—CH₂—CH₁₃ or Y=direct bond and X₂ = (various aryl groups with SO₂H, SO₃H, NH₂, OCH₂ substituents as shown)

The invention also provides a process for preparing the dyestuffs of the formula (2), (2a), (3), (3a), (4), (5), (5a) and (5b) which is characterised in that the diarylides of the formulae

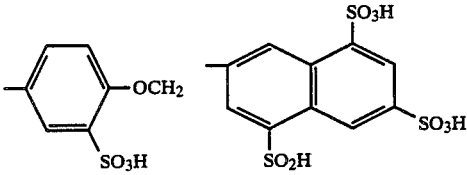

(6)

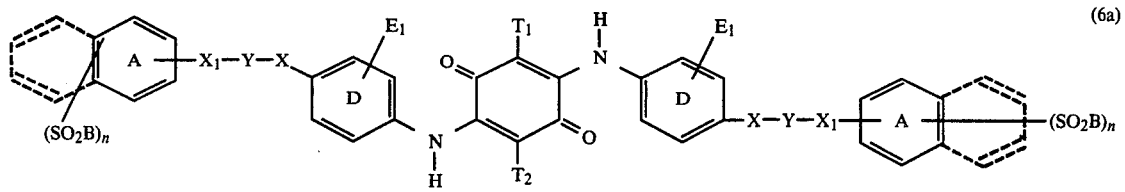
(6a)
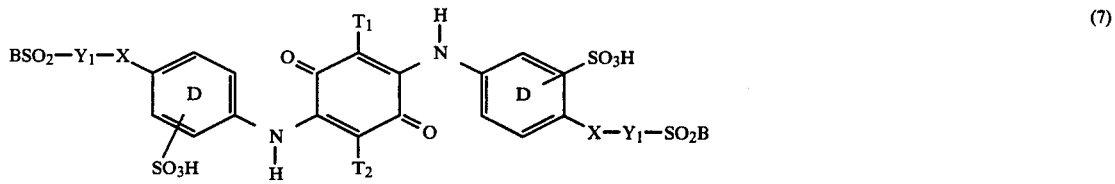
(7)
(7a)
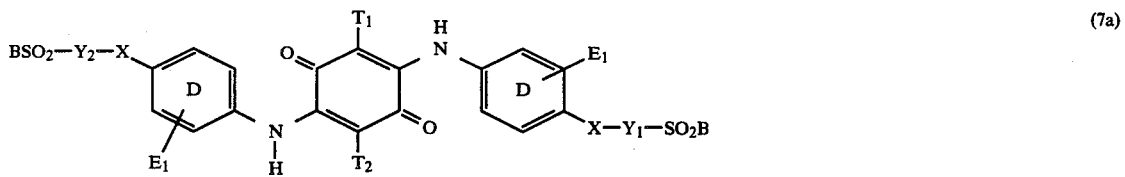
(8)
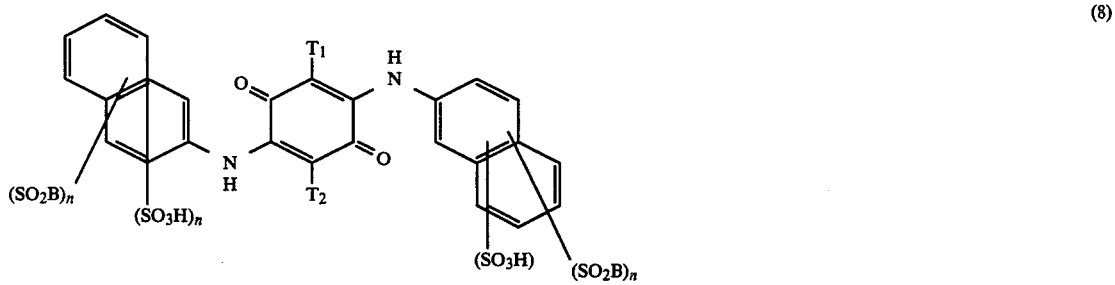
(9)
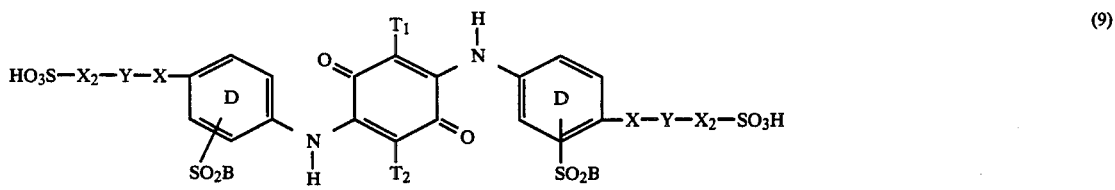
(9a)
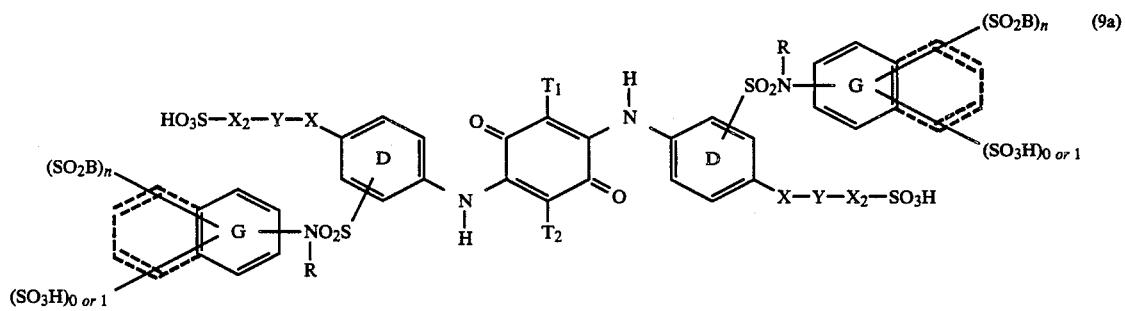
(9b)
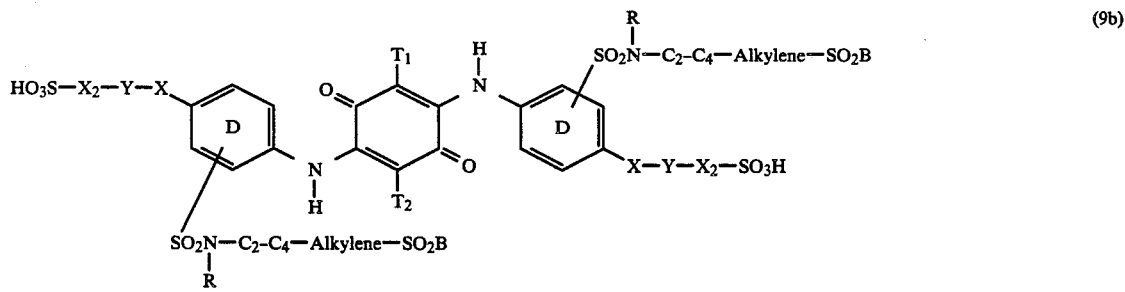

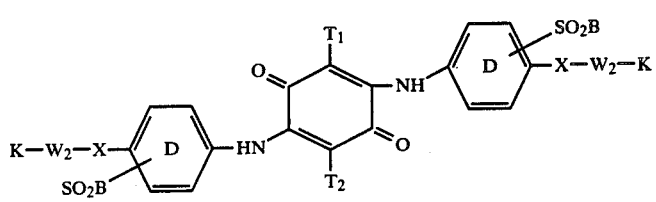

are treated with an acid condensing agent which, through elimination of hydrogen, causes ring closure to the triphendioxazine system. The acid condensing agent used is 10 to 50% strength oleum. The reaction temperature is of the order of 0° to 80° C., preferably 20° to 60° C. For instance, the diarylides can be cyclised at temperatures of 10° to 50° C., preferably 20° to 40° C., with 5 to 10 times the weight of 30–50% strength, preferably 35–40% strength, oleum.

The diarylides can also be cyclised in accordance with British Patent Specification No. 1,589,915, where the reaction is carried out at 0° to 60° C. in 5 to 30% strength oleum with 1–3 moles of persulphate per mole of diarylide.

Examples of ring closures with oleum are found in German Offenlegungsschrift No. 2,503,611.

It is particularly preferred to prepare compounds of the formula (2) to (5c) in which B is $CH_2CH_2OSO_3$, the starting material being compounds of the formulae (6) to (9c) in which B is $CH_2CH_2OH$.

The ring closure in oleum is accompanied by a sulphation of the OH group to the sulphuric acid ester.

Further aliphatic OH groups are sulphated under the conditions of the ring closure, and sulphations of aromatic rings can occur.

The diarylides of the formulae (6) to (9c) can be prepared by known methods, as mentioned, for example, in German Offenlegungsschriften Nos. 2,302,382, 2,344,781, 2,503,611 and 2,823,828 and in British Patent Specification No. 2,059,985. For instance, 1 mole of a p-benzoquinone, in particular 2,3,5,6-tetrachloro-1,4-benzoquinone, can be reacted with 2 moles of a compound of the formula

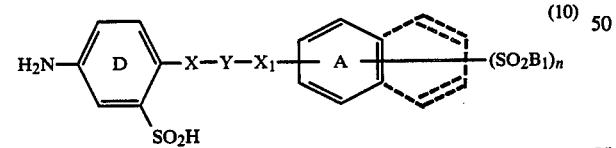
(10)

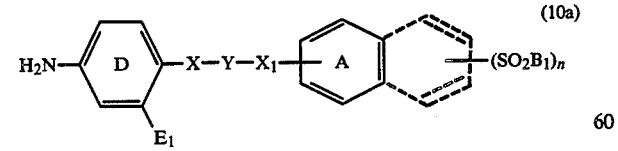
(10a)

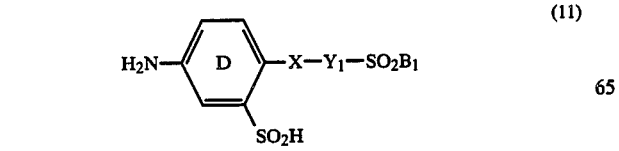
(11)

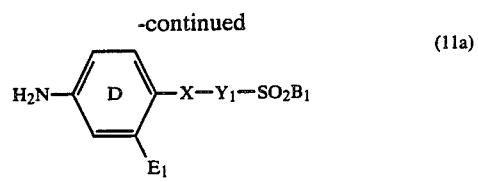
(11a)

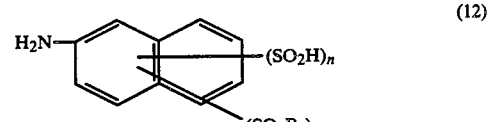
(12)

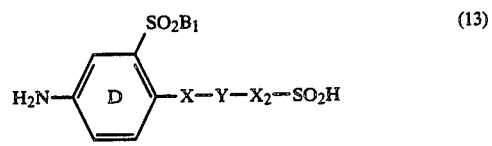
(13)

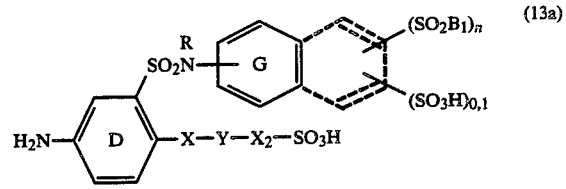
(13a)

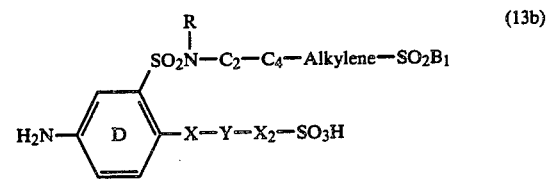
(13b)

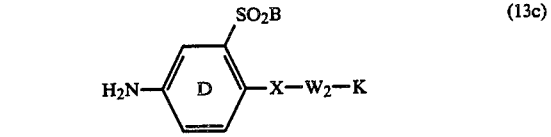
(13c)

wherein
$B_1$ is B or $CH_2CH_2OH$ to give the diarylides of the formulae (6) to (9c).

The following are examples of amines of the formulae (10) to (13c):

Formula (10)

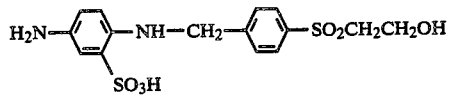

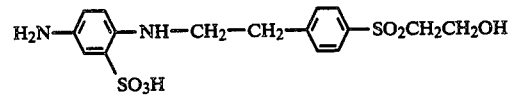

-continued
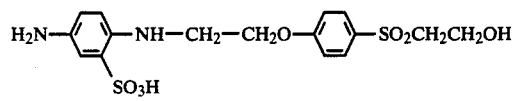
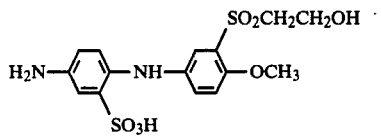
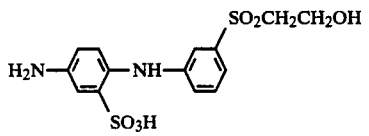
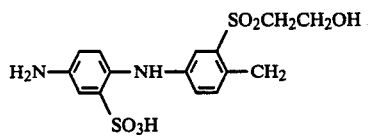
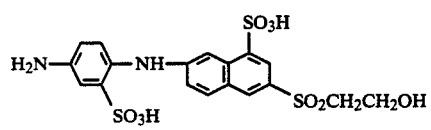
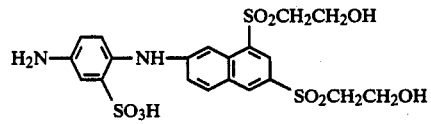
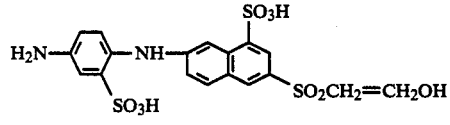
Formula (10a)
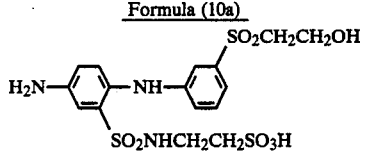
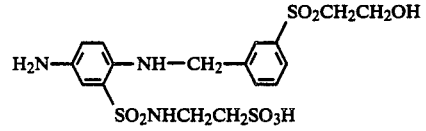
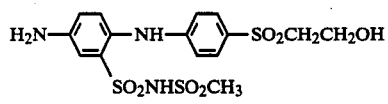
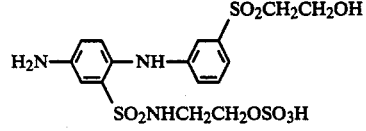
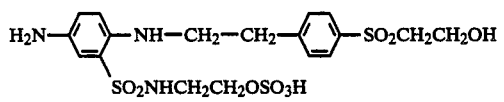
Formula (11)
-continued
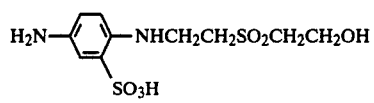
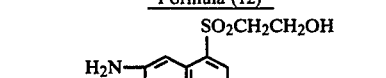
Formula (12)
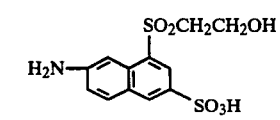
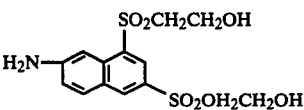
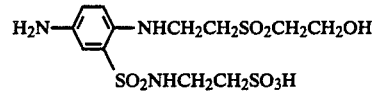
Formula (12a)
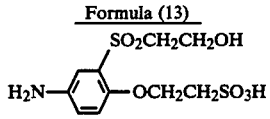
Formula (13)
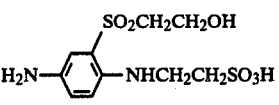
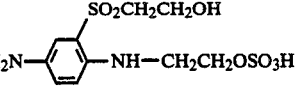
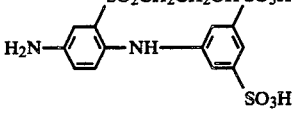
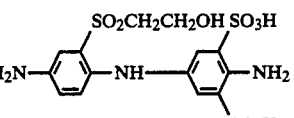
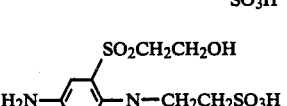
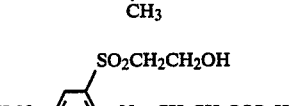
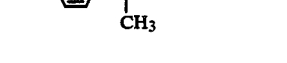

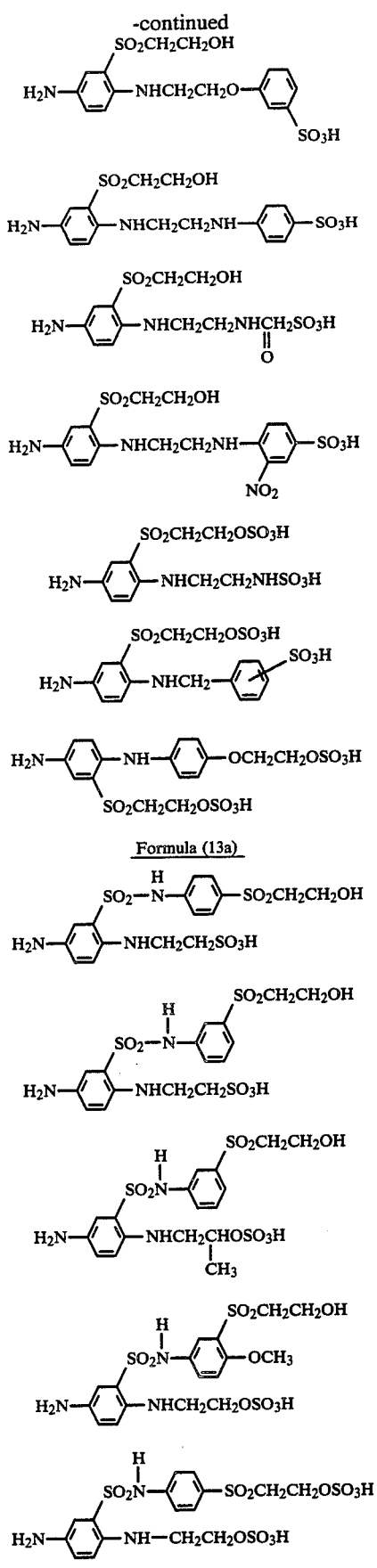

Formula (13a)

Formula (13b)

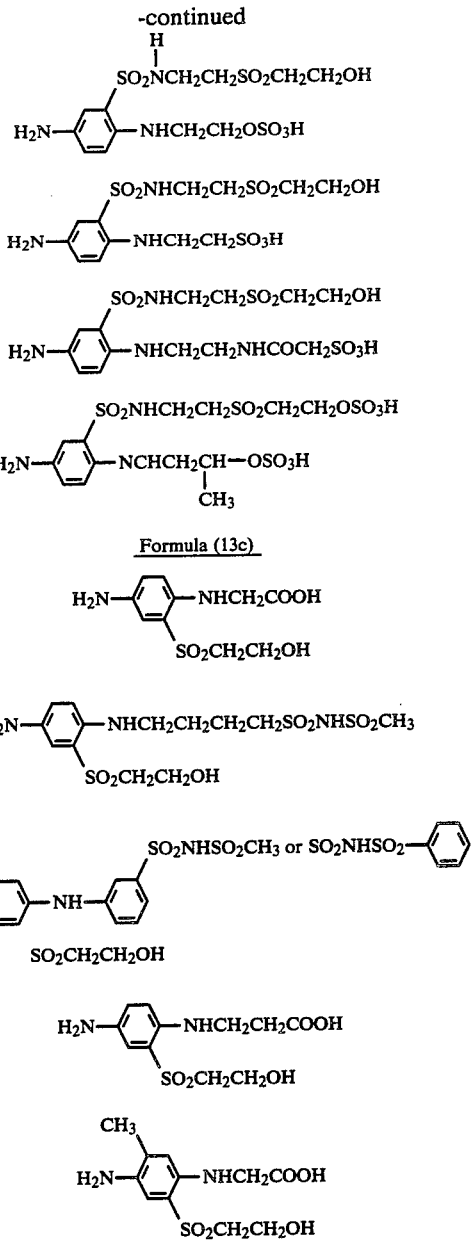

Formula (13c)

p-Benzoquinones suitable for the condensation with the amines of the formulae (10) to (13c), in addition to the 2,3,5,6-tetrachlorobenzoquinone already mentioned, are (reactions of this type are described in detail in German Offenlegungsschrift No. 2,823,828): 1,4-benzoquinone, 2-methyl-1,4-benzoquinone, 2-ethyl-1,4-benzoquinone, 2-n-propyl-1,4-benzoquinone, 2-isopropyl-1,4-benzoquinone, 2,2'-ethoxyethyl-1,4-benzoquinone, 2-phenyl-1,4-benzoquinone, 2-(4'-methylphenyl)-1,4-benzoquinone, 2-(4'-methoxyphenyl)-1,4-benzoquinone, 2-(3'-chlorophenyl-1,4-benzoquinone, 2-(4'-nitrophenyl)-1,4-benzoquinone, 2,5-dimethyl-1,4-benzoquinone, 2-methyl-5-ethyl-1,4-benzoquinone, 2-methyl-3-chloro-1,4-benzoquinone, 2-methyl-6-chloro-1,4-benzoquinone, 2-methyl-3,5-dichloro-1,4-benzoquinone, 2-methyl-3,5,6-tribromo-1,4-benzoquinone, 2-(4'-methylphenoxy)-3,6-dibromo-1,4-benzoquinone, 2-(3'-methylphenoxy)-3,6-dibromo-1,4-benzoquinone, 2- methyl-3,5,6-trichloro-1,4-benzoquinone, 2-methyl-3-chloro-5-bromo-1,4-benzoquinone, 2-methyl-3,6-dichloro-1,4-benzoquinone, 2-methyl-3,6-dichloro-5-bromo-1,4-benzoquinone, 2-phenyl-3,6-dichloro-1,4-benzoquinone, 2-(4'-methoxyphenyl)-3,6-dichloro-1,4-benzoquinone, 2-(4'-chlorophenyl)-3,6-dichloro-1,4-benzoquinone, 2-(4'-nitrophenyl)-3,6-dichloro-1,4-benzoquinone, 2-(4'-nitrophenyl-3,5,6-trichloro-1,4-benzoquinone, 2,5-dimethyl-3,6-dibromo-1,4-benzoquinone, 2,5-dimethyl-3-chloro-1,4-benzoquinone, 2-methyl-5-n-propyl-6-bromo-1,4-benzoquinone, 2-methyl-5-isopropyl-3-chloro-1,4-benzoquinone, 2-methyl-5-isopropyl-6-bromo-1,4-benzoquinone and 2-(2'-chlorophenyl)-3,5,6-tribromo-1,4-benzoquinone, 2-methyl-3-methoxy-1,4-benzoquinone, 2,3,5,6-tetramethoxy-1,4-benzoquinone, 2,3,5,6-tetraphenoxy-1,4-benzoquinone, 2,3,5,6-tetra-(4'-methylphenoxy)-1,4-benzoquinone, 2,3,5,6-tetra-(4'-methoxyphenoxy)-1,4-benzoquinone, 2,3,5,6-tetra-(4'-chlorophenoxy)-1,4-benzoquinone, 2,3,5,6-tetra-4-(3'-methyl-4'-chlorophenoxy)-1,4-benzoquinone, 2-ethyl-3,6-dimethoxy-1,4-benzoquinone, 2-chloro-3,6-dimethoxy-1,4-benzoquinone, 2,3,5-trimethoxy-1,4-benzoquinone, 2,5-dimethyl-3,6-dimethoxy-1,4-benzoquinone, 2,5-dimethyl-3,6-dimethoxy-1,4-benzoquinone, 2-methyl-3,6-dimethoxy-1,4-benzoquinone, 2-methyl-5,6-dimethoxy-1,4-benzoquinone, 2-ethyl-3,6-dimethoxy-1,4-benzoquinone, 2-chloro-3-n-propyl-5-methoxy-1,4-benzoquinone, 2-chloro-3,5-dimethoxy-1,4-benzoquinone and 2,3,5,6-tetrabromo-1,4-benzoquinone.

The new dyestuffs of the formula (1) are suitable for dyeing and printing hydroxyl- or amide-containing materials, such as textile fibres, yarns and fabrics made of wool, silk, nylon and polyurethane fibres, and for the wash-fast dyeing and printing of natural or regenerated cellulose, cellulose materials being advantageously treated in the presence of acid-binding agents and, if desired, under heat, using the processes disclosed for reactive dyestuffs of the type according to the invention.

The formulae shown are those of the corresponding free acids. The dyestuffs are generally isolated, and used in dyeing, in the form of the alkali metal salts, in particular the sodium salts.

The weights referred to in the examples relate to the free acid. The colour codes shown in the examples are the indicator numbers given in the Colour Index hue indication chart.

The formulae given in the following examples always refer to one of the isomeric reaction products formed in the reaction; as to the position of the substituents in the two outer aromatic rings of the triphendioxazine system of the isomeric reaction products, reference is made to what was said under formulae (2) to (5c).

EXAMPLE 1

0.05 mole of the dianilide of the formula

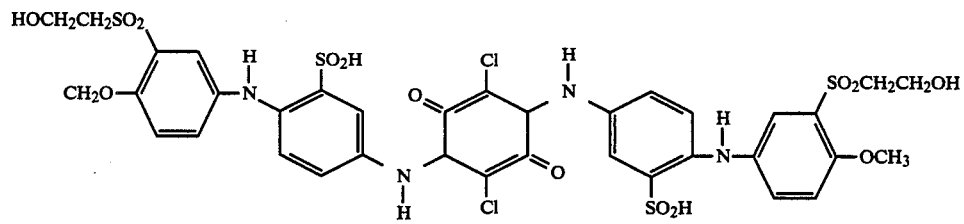

is introduced at 25° to 40° C. into 200 ml of 25% strength oleum. The mixture is raised to 60° C. in the course of 15 minutes and is stirred at said temperature for 1 hour. When the mixture is cooled down to room temperature it is poured onto 1 kg of ice, and the dyestuff is salted out by adding 10% by volume of sodium chloride. The paste obtained on filtering with suction is again suspended in water, and the suspension is brought to pH 5-6 with sodium hydrogencarbonate. Salting out, filtering with suction, and drying at 60° C. in a vacuum cabinet and grinding produces a blue powder which dyes cotton in brilliant blue shades (indicator number 14).

The dyestuff has the formula

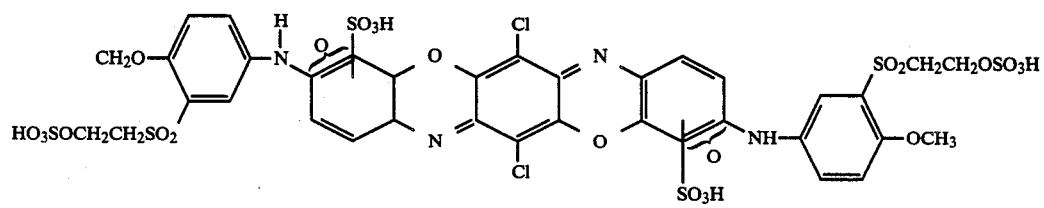

Further useful dyestuffs which dye cotton in brilliant blue shades are obtained if this example is repeated using the following diarylides as starting materials:

| | Hue indicator number |
|---|---|
| ![structure] | 14 |
| ![structure] | 13 |
| ![structure] | 13 |
| ![structure] | 13 |
| ![structure] | 12 |
| ![structure] | 13 |
EXAMPLE 2a
41.05 g (0.05 mole) of the dianilide of the formula
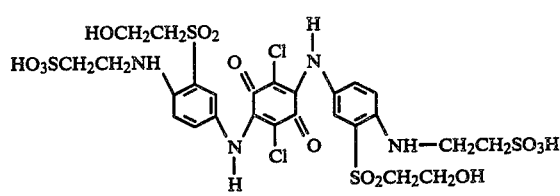

are introduced at 25° to 40° C. into 800 g of 25% strength oleum. The mixture is heated to 50° to 60° C. in the course of 15 minutes and is stirred until the cyclisation is complete (as can be monitored by thin layer chromatography).

After cooling down to room temperature the mixture is poured onto 2 kg of ice-water and 10% by volume of sodium or potassium chloride are added. The paste obtained on filtering with suction is stirred into ice-water, and the suspension is brought to pH 5-6 with sodium hydrogen-carbonate. Salting out, filtering with suction, drying at 60° C. in a vacuum cabinet, and grinding gives a blue powder which dyes cotton in brilliant blue shades (hue indicator number 13). The dyestuff has the formula water at such a rate that the temperature does not exceed 10°. 10% by volume of sodium or potassium chloride are then added. The precipitate is filtered off with suction, and the paste is introduced into ice-water. The suspension is brought to pH 5-6 by adding sodium hydrogen-carbonate. Salting out, filtering with suction, drying at 60° C. in a vacuum cabinet and grinding produces a blue powder which likewise dyes cotton in brilliant blue shades (hue indicator number 13).

The dyestuff has the formula given for Example 2a.

Dyestuffs having sulphonamide groups are advantageously prepared using methods 2b and 2c.

Further useful dyestuffs are obtained if Example 2a, 2b or 2c is repeated using the dianilides listed hereinafter; the starting materials and end products are charac-

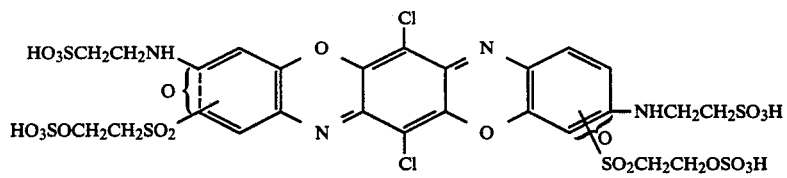

EXAMPLE 2b 41.05 g of the dianilide of Example 2a are introduced at 20° to 25° C. into 400 g of 20% strength oleum in the course of 15 minutes. 22.8 g of ammonium persulphate are then introduced at 20° to 30° C. in 7 portions of equal size at 1 hour intervals. The mixture is then stirred at 20° to 30° C. for an additional hour. The reaction mixture is discharged onto 1 kg of ice-water, and 10% by volume of sodium or potassium chloride are added. The paste obtained on filtering with suction is stirred into ice-water, and the suspension is brought to pH 5-6 with sodium hyrogencarbonate. Salting out, filtering with suction, drying at 60° C. in a vacuum cabinet and grinding produces a blue powder which likewise dyes cotton in brilliant blue shades (hue indicator number 13). The dye-stuff has the formula given for Example 2a.

EXAMPLE 2c 41.05 g of dianilide of Example 2a are introduced at 20° to 30° C. with thorough stirring into a mixture of 80 ml of 20% strength and 60 ml of 65% strength oleum. 1 g of potassium iodide is added at 20° C. The mixture is stirred at 20° C. to 23° C. for 45 minutes, and the melt is then allowed to flow into 1,000 g of ice and 200 ml of terised by the following formulae (examples of dyestuffs of the subformulae 5, 5a, 5b and 5c, Table 1).

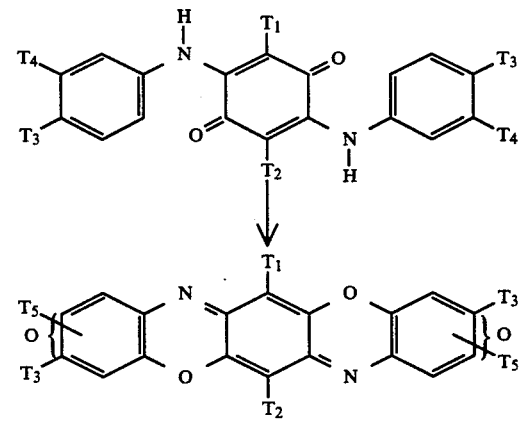

Hue indicator number
13=bright reddish blue
14=bright blue
9=bright bluish red
15=bright greenish blue The sulpho group in $T_3$ in Examples 13, 28 and 26 is introduced in the course of ring closure in oleum.

TABLE 1

| Example | $T_1$ | $T_2$ | $T_3$ | $T_4$ | $T_5$ | Hue indicator number |
|---|---|---|---|---|---|---|
| 2 | Br | Br | NHCH$_2$CH$_2$SO$_3$H | SO$_2$CH$_2$CH$_2$OH | OH group in $T_4 \longrightarrow OSO_3H$ | 13 |
| 3 | CH$_3$ | CH$_3$ | " | " | OH group in $T_4 \longrightarrow OSO_3H$ | 13 |
| 4 | Cl | Cl | NCH$_2$CH$_2$SO$_3$H<br>\|<br>CH$_3$ | " | OH group in $T_4 \longrightarrow OSO_3H$ | 13 |

TABLE 1-continued

| Example | T₁ | T₂ | T₃ | T₄ | T₅ | Hue indicator number |
|---|---|---|---|---|---|---|
| 5 | " | " | NH(CH₂)₄SO₃H | " | OH group in T₄ ⟶ OSO₃H | 13 |
| 6 | " | " | OCH₂CH₂SO₃H | " | OH group in T₄ ⟶ OSO₃H | 9 |
| 7 | " | " | 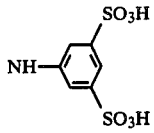 | " | OH group in T₄ ⟶ OSO₃H | 13 |
| 8 | " | " | 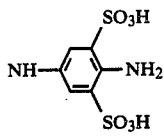 | " | OH group in T₄ ⟶ OSO₃H | 13 |
| 9 | " | " | 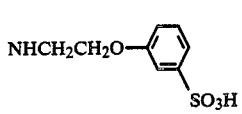 | " | OH group in T₄ ⟶ OSO₃H | 13 |
| 10 | " | " | 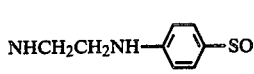 | " | OH group in T₄ ⟶ OSO₃H | 13 |
|   |   |   | 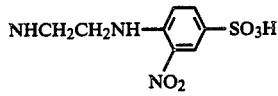 | " | OH group in T₄ ⟶ OSO₃H | 13 |
| 11 | " | " | 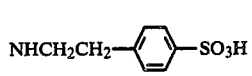 | " | OH group in T₄ ⟶ group | 15 |
| 12 | " | " | 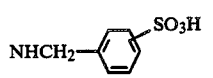 | " | OH group in T₄ ⟶ group | 13 |
| 13 | " | " | 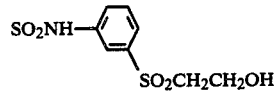 | " | OH group in T₄ ⟶ group | 13 |
| 14 | " | " | NHCH₂CH₂SO₃H | 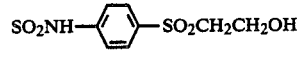 | OH group in T₄ ⟶ group | 13 |
| 15 | " | " | " | 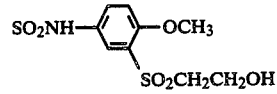 | OH group in T₄ ⟶ group | 13 |
| 16 | " | " | " | 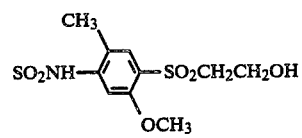 | OH group in T₄ ⟶ group | 13 |
| 17 | " | " | " | 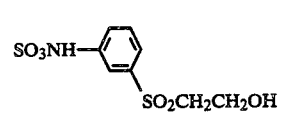 | OH group in T₄ ⟶ group | 13 |
| 18 | Br | Br | " |  | OH group in T₄ ⟶ OSO₃H | 13 |

TABLE 1-continued

| Example | T₁ | T₂ | T₃ | T₄ | T₅ | Hue indicator number |
|---|---|---|---|---|---|---|
| 19 | Cl | Cl | NHCH₂CH₂OSO₃H | SO₂NH—⟨phenyl⟩—SO₂CH₂CH₂OH | OH group in T₄ ⟶ OSO₃H | 13 |
| 19a | " | " | NHCH₂CH₂OH<br>↓ Sulphation by ring closure in oleum<br>NHCH₂CH₂OSO₃H | " | OH group in T₄ ⟶ OSO₃H | 13 |
| 20 | " | " | NHCH₂CH₂OSO₃H | SO₂NH—⟨phenyl⟩—SO₂CH₂CH₂OSO₃H | T₅ = T₄ | 13 |
| 21 | " | " | " | SO₂NH—⟨phenyl⟩—SO₂CH₂CH₂OH | OH group in T₄ ⟶ OSO₃H | 13 |
|  |  |  | NHCH₂CH₂OH<br>↓ Sulphation by ring closure in oleum<br>NHCH₂CH₂OSO₃H | " | OH group in T₄ ⟶ OSO₃H |  |
| 22 | " | " | NHCH₂CH₂OSO₃H | SO₂NH—⟨phenyl(—OCH₃)⟩—SO₂CH₂CH₂OH | OH group in T₄ ⟶ OSO₃H | 13 |
| 23 | " | " | NHCH₂CH₂SO₃H | SO₂NHCH₂CH₂SO₂CH₂CH₂OH | OH group in T₄ ⟶ OSO₃H | 13 |
| 24 | " | " | NHCH₂CH₂OSO₃H | " | OH group in T₄ ⟶ OSO₃H | 13 |
| 25 | " | " | NHCH₂—⟨phenyl⟩—SO₃H | SO₂NH—⟨phenyl⟩—SO₂CH₂CH₂OH | OH group in T₄ ⟶ OSO₃H | 13 |
| 26 | " | " | NHCH₂CH₂—⟨phenyl⟩—SO₃H | SO₂NH—⟨phenyl⟩—SO₂CH₂CH₂OH | OH group in T₄ ⟶ OSO₃H | 13 |
| 27 | Br | Br | " | " | OH group in T₄ ⟶ OSO₃H | 13 |
| 28 | Cl | Cl | NH—⟨phenyl⟩—SO₃H | " | OH group in T₄ ⟶ OSO₃H | 13 |
| 29 | " | " | NH—⟨phenyl⟩—SO₃H | SO₂NHCH₂CH₂SO₂CH₂CH₂OH | OH group in T₄ ⟶ OSO₃H | 13 |
| 30 | " | " | NHCH₂CH₂NHCOCH₂SO₃H | " | OH group in T₄ ⟶ OSO₃H | 13 |

TABLE 1-continued

| Example | T₁ | T₂ | T₃ | T₄ | T₅ | Hue indicator number |
|---|---|---|---|---|---|---|
| 31 | " | " | NHCH₂CH₂SO₃H | SO₂NH-[naphthyl with SO₃H and SO₂CH₂CH₂OSO₃H] | T₅ = T₄ | 13 |
| 32 | " | " | NHCH₂CH₂OSO₃H | " | T₅ = T₄ | 13 |
| 33 | " | " | " | SO₂NH-[naphthyl with SO₂CH₂CH₂OH and SO₂CH₂CH₂OH] | OH group in T₄ ⟶ OSO₃H | 13 |
| 34 | " | " | NHCH₂CH₂NHSO₃H | SO₂CH₂CH₂OSO₃H | T₅ = T₄ | 13 |
| 35 | " | " | NHCH₂CH₂OSO₃H | SO₂NH-[phenyl]-SO₂CHCH₂OSO₂H | T₅ = T₄ | 13 |
| 36 | " | " | NHCH₂CH₂OSO₃H | SO₂NH-[phenyl]-SO₂CH₂CH₂OSO₃H | T₅ = T₄ | 13 |
| 37 | " | " | NHCH₂COOH | SO₂CH₂CH₂OSO₃H | T₅ = T₄ | 13 |
| 38 | " | " | NHCH₂CH₂CH₂CH₂SO₂NHSO₂CH₃ | " | T₅ = T₄ | 13 |
| 39 | " | " | NH-[phenyl]-SO₂NHSO₂CH₃ | " | T₅ = T₄ | 13 |

Further useful dyestuffs are obtained if Example 2a, 2b or 2c is repeated using the dianilides listed hereinafter; the starting materials and end products are characterised by the following formulae (examples of dyestuffs of subformulae 2 and 3, Table 2).

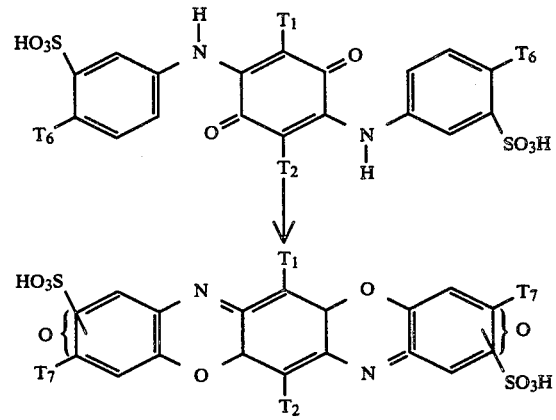

Hue indicator number
13=bright reddish blue
14=bright blue

TABLE 2

| Example | T₁ | T₂ | T₆ | T₇ | Hue indicator number |
|---|---|---|---|---|---|
| 1 | Cl | Cl | NHCH₂-[phenyl]-SO₂CH₂CH₂OH | OH group in T₆ ⟶ OSO₃H | 13 |
| 2 | " | " | NHCH₂CH₂-[phenyl]-SO₂CH₂CH₂OH | | " |

TABLE 2-continued

| Example | T₁ | T₂ | T₆ | T₇ | Hue indicator number |
|---|---|---|---|---|---|
| 3 | " | " | *p*-HOCH₂CH₂SO₂-C₆H₄-OCH₂CH₂NH– | | " |
| 4 | " | " | 3-(HOCH₂CH₂SO₂)-4-(OCH₃)-C₆H₃-NH– | | " |
| 5 | " | " | " | | " |
| 6 | Br | Br | 3-(HOCH₂CH₂SO₂)-C₆H₄-NH– | | " |
| 7 | Cl | Cl | *p*-HOCH₂CH₂SO₂-C₆H₄-NH– | | " |
| 8 | Br | Br | 3-(HOCH₂CH₂SO₂)-4-CH₃-C₆H₃-NH– | | " |
| 9 | Cl | Cl | 6-amino-1,3-bis(HO₃SOCH₂CH₂SO₂)-naphthalen-2-yl (7-NH–, 1,3-SO₂CH₂CH₂OSO₃H) | T₇ = T₆ | 14 |
| 10 | " | " | 6-amino-1-SO₃H-3-(HO₃SOCH₂CH₂SO₂)-naphthalen-2-yl | " | 14 |
| 11 | Br | Br | 6-amino-1-SO₃H-3-(HO₃SOCH₂CH₂SO₂)-naphthalen-2-yl | T₆ = T₇ | 14 |
| 12 | CH₃ | CH₃ | 6-amino-1,3-bis(HOCH₂CH₂SO₂)-naphthalen-2-yl | OH group in T₆ → OH | 14 |
| 13 | Cl | Cl | NHCH₂CH₂SO₂CH₂CH₂OH | " | 13 |
| 14 | " | " | NHCH₂CH₂SO₂CH₂CH₂OSO₃H | T₆ = T₇ | 13 |
| 15 | " | " | 7-amino-1-SO₃H-3-(HO₃SOCH₂CH₂SO₂)-naphthalen-2-yl | T₆ = T₇ | 14 |

Further useful dyestuffs are obtained if Example 2a, 2b or 2c is repeated using the dianilides listed hereinafter; the starting materials and end products are characterised by the following formulae (examples of dyestuffs of subformulae 2a or 3a, Table 3).

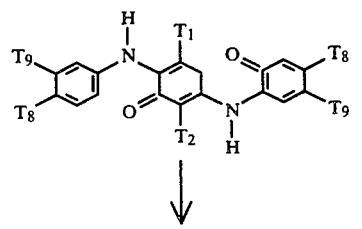

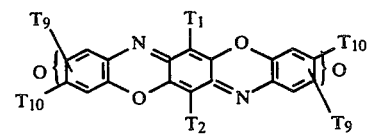

Hue indicator number
13=bright reddish blue
14=bright blue

TABLE 3

| Example | $T_1$ | $T_2$ | $T_8$ | $T_9$ | $T_{10}$ | Hue indicator number |
|---|---|---|---|---|---|---|
| 1 | Cl | Cl | NH—(naphthalene with $SO_3H$)—$SO_2CH_2CH_2OH$ | $SO_2NHCH_2CH_2SO_3H$ | OH group in $T_8 \longrightarrow OSO_3H$ | 14 |
| 2 | " | " | NH—(naphthalene with $SO_3H$)—$SO_2CH_2CH_2OSO_3H$ | " | $T_{10} = T_8$ | " |
| 3 | " | " | NH—⟨⟩—$SO_2CH_2CH_2OSO_3H$ | $SO_2NH$—⟨⟩—$SO_3H$ | " | 13 |
| 4 | " | " | $NHCH_2CH_2$—⟨⟩—$SO_2CH_2CH_2OH$ | $SO_2NHCH_2CH_2OH$ Sulphation by ring closure in oleum | OH group in $T_8 \longrightarrow OSO_3H$ | " |
| 5 | " | " | NH—⟨⟩—$SO_2CH_2CH_2OH$ | $SO_2NHCH_2CH_2SO_3H$ | " | " |
| 6 | " | " | $NHCH_2$—⟨⟩—$SO_2CH_2CH_2OH$ | " | | " |
| 7 | " | " | $NH-CH_2CH_2$—⟨⟩—$SO_2CH_2CH_2OH$ | " | | " |
| 8 | " | " | NH—⟨⟩—$SO_2CH_2CH_2OH$ | " | | " |
| 9 | " | " | NH—⟨⟩(—$OCH_3$)—$SO_2CH_2CH_2OH$ | " | | " |
| 10 | " | " | NH—⟨⟩—$SO_2CH_2CH_2OH$ | $SO_2NHCH_2CH_2OSO_3H$ | | " |

TABLE 3-continued

| Example | T₁ | T₂ | T₈ | T₉ | T₁₀ | Hue indicator number |
|---|---|---|---|---|---|---|
| 11 | " | " | NH—⟨C₆H₃(CH₃)⟩—SO₂CH₂CH₂OH | " | | " |
| 12 | " | " | NH—⟨naphthyl⟩—SO₂CH₂CH₂OH | " | | 14 |
| 13 | " | " | NHCH₂CH₂SO₂CH₂CH₂OH | SO₂NHCH₂CH₂SO₃H | OH group in T₈ ⟶ OSO₃H | 13 |
| 14 | " | " | NHCH₂CH₂SO₂CH₂CH₂OH | SO₂NHCH₂CH₂OSO₃H | " | " |
| 15 | " | " | HN—⟨naphthyl(SO₃H)⟩—SO₂CH₂CH₂OH | H | " | 14 |
| 16 | " | " | HN—⟨naphthyl(SO₂CH₂CH₂OH)⟩—SO₂CH₂CH₂OH | " | " | 15 |
| 17 | " | " | HNCH₂CH₂—⟨C₆H₄⟩—SO₂CH₂CH₂OH | COOH | " | 13 |
| 18 | " | " | HN—⟨C₆H₃(SO₂CH₂CH₂OH)⟩—SO₂CH₂CH₂OH | H | " | " |
| 19 | " | " | HN—⟨C₆H₃(SO₃H)⟩—SO₂CH₂CH₂OH | " | " | " |
| 20 | " | " | HN—⟨C₆H₂(Cl)(SO₂CH₂CH₂OH)⟩—SO₂CH₂CH₂OH | " | " | " |

Further useful dyestuffs are obtained if Example 2a, 2b or 2c is repeated using the dianilides listed hereinafter; the starting materials and end products are characterised by the following formulae (examples of dyestuffs of subformula 4, Table 4).

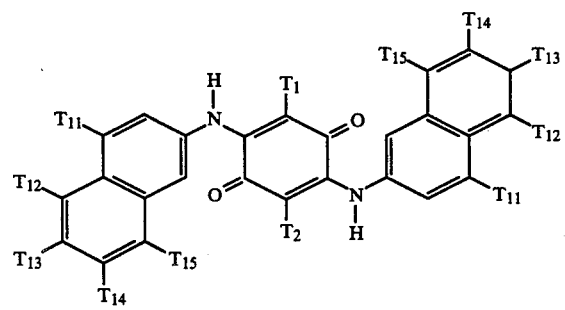

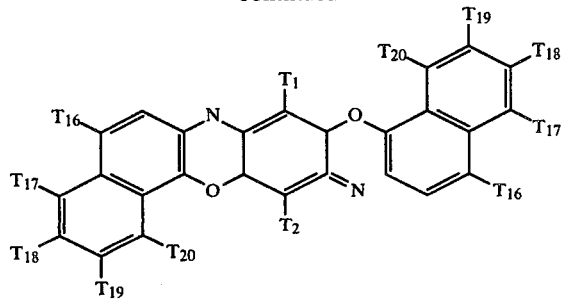

In the table B represents SO$_2$CH$_2$CHhd 2OSO$_3$H and B$_2$ represents SO$_2$CH$_2$CH$_2$OH.

Hue indicator number
13=bright reddish blue

Z=OSO$_3$H, Cl, S$_2$O$_3$H$_2$, OCOCH$_3$, OPO$_3$H$_2$, N$^{(+)}$(CH$_3$)$_3$

E=

TABLE 4

| Examples | T$_1$ | T$_2$ | T$_{11}$ | T$_{12}$ | T$_{13}$ | T$_{14}$ | T$_{15}$ | T$_{16}$ | T$_{17}$ | T$_{18}$ | T$_{19}$ | T$_{20}$ |
|---|---|---|---|---|---|---|---|---|---|---|---|---|
| 1 | Cl | Cl | H | H | B$_2$ | H | SO$_3$H | H | H | B | H | SO$_3$H |
| 2 | Cl | Cl | H | H | B | H | SO$_3$H | H | H | B | H | SO$_3$H |
| 3 | Cl | Cl | B$_2$ | H | SO$_3$H | H | H | B | H | SO$_3$H | H | H |
| 4 | Cl | Cl | B$_2$ | H | H | SO$_3$H | H | B | H | H | SO$_3$H | H |
| 5 | Cl | Cl | SO$_3$H | H | B$_2$ | H | B$_2$ | SO$_3$H | H | B | H | B |
| 6 | Br | Br | H | H | B$_2$ | H | SO$_3$H | H | H | B | H | SO$_3$H |

I claim:
1. A triphendioxazine dyestuff of the formula (I)

$$T{-}(E)_a \begin{matrix} [W_1{-}(SO_2B)_{1-2}]_2 \\ (X{-}W_2{-}SO_3H)_b \end{matrix} \quad (1)$$

wherein

T is
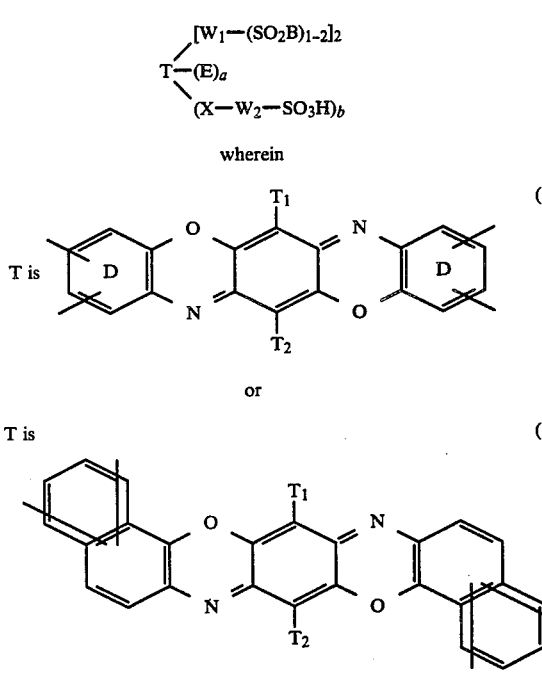

(1a)

or

T is (1b)

wherein
T=(1a) or (1b) and wherein the benzene rings D and the naphthalene rings in T may be further substituted by Cl, Br, CH$_3$, C$_2$H$_5$, OCH$_3$, OC$_2$H$_5$ or COOH and wherein T$_1$ and T$_2$ are each: H, Cl, Br, F, C$_1$-C$_4$-alkyl, C$_1$-C$_4$-alkoxy, phenyl, phenyl substituted by Cl, CH$_3$, C$_2$H$_5$, OCH$_3$ or OC$_2$H$_5$ or phenoxy or phenoxy substituted by Cl, CH$_3$, C$_2$H$_5$, OCH$_3$ or OC$_2$H$_5$,
B=—CH=CH$_2$ or —CH$_2$CH$_2$—Z

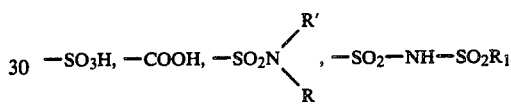

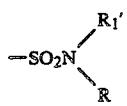

wherein
R'=

C$_2$—C$_6$—alkylene—(O)—SO$_3$H
0 or 1

R=H, C$_1$-C$_4$-alkyl, C$_1$-C$_4$-alkyl substituted with OH, OCH$_3$, COOH or SO$_3$H
R$_1$=CH$_3$, C$_6$H$_5$,
R$_1$'=phenyl, sulfophenyl, disulfophenyl
W$_1$=direct bond or bridge member which is free of heterocyclic groups and is bonded to an aromatically carbocyclic C-atom in T, SO$_2$B being bonded to a C-atom in W$_1$ or if W$_1$ is a direct bond to an aromatically carbocyclic C-atom in T,
X=O, NR or S, wherein R is defined as above,
W$_2$=aliphatic, araliphatic or aromatically carbocyclic bridge member
a=0-2
b=0-2 wherein $a+b=0$ or 2, wherein if $a+b=0$, W$_1$ has at least one anionic group conferring water-solubility or two SO$_2$B-groups are bonded to W$_1$, and wherein if E is SO$_3$H and a=2, W$_1$ represents W$_3$=

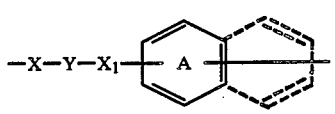

with
Y=direct bond or $C_1$-$C_6$-alkylene which is optionally substituted and/or optionally interrupted by heteroatoms;
X as defined above;
$X_1$=direct bond, O or NR and R as defined above and wherein the benzene or naphthalene nuclei A can be substituted by Cl, Br, $CH_3$, $C_2H_5$, $OCH_3$, $OC_2H_5$, COOH, $SO_3H$, $SO_2NH$ or $SO_2NHCH_3$, or $W_3$=—X—$Y_1$=with
$Y_1$=$C_2$-$C_6$-alkylene, optionally interrupted by heteroatoms and X as defined above.

2. A triphendioxazine dyestuff of claim 1, wherein $W_1$=direct bond or

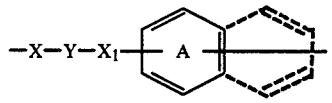

wherein X and $X_1$ have the meaning given in claim 1,
Y=direct bond, $C_1$-$C_6$-alkylene, $C_1$-$C_6$-alkylene interrupted by O, N, or S, $C_1$-$C_6$-alkylene substituted by COOH, $SO_3H$, halogen, phenyl or sulfophenyl;
or $W_1$=—X—$Y_1$ with X as defined in claim 1, and $Y_1$=$C_2$-$C_6$-alkylene, $C_2$-$C_6$-alkylene interrupted by O, S or N and wherein the benzene or naphthalene nucleus A may be substituted by Cl, Br, $CH_3$, $OCH_3$, COOH, $SO_3H$, $SO_2NHCH_3$, $SO_2NH_2$, $OC_2H_5$ or $C_2H_5$ or $W_1$=—X—aralkylene—with X defined as in claim 1 aralkylene=$C_1$-$C_6$-alkylenephenylene, phenylene-$C_1$-$C_6$-alkylene, $C_1$-$C_6$-alkylenenaphthylene, naphthylene-$C_1$-$C_6$-alkylene

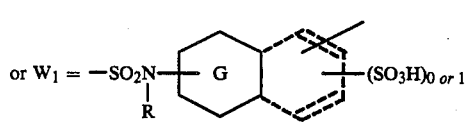

wherein the benzene or naphthalene nucleus G may be substituted by Cl, Br, $CH_3$, $OCH_3$, COOH, $SO_3H$, $SO_2NHCH_3$, $SO_2NH_2$, $OC_2H_5$ or $C_2H_5$ and wherein R is defined as in claim 1, or

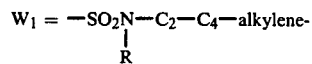

where R is defined as in claim 1.

3. A triphendioxazine dyestuff according to claim 1 of the formula,

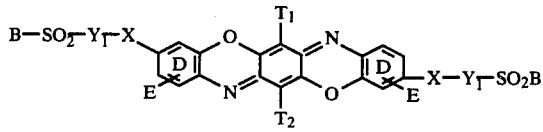

wherein
X, $Y_1$, $T_1$, $T_2$, E, B and D are as defined in claim 1.

4. A triphendioxazine dyestuff according to claim 1 of the formula

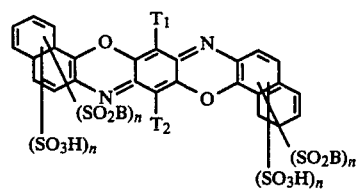

wherein B, $T_1$ and $T_2$ are as defined in claim 1 and n is 1.

5. A triphendioxazine dyestuff of the formula

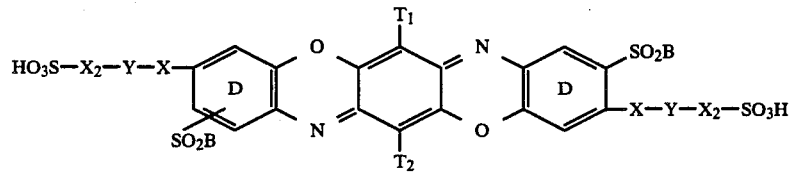

wherein
the benzene rings D may be further substituted by Cl, Br, $CH_3$, $C_2H_5$, $OCH_3$, $OC_2H_5$ or COOH; $T_1$ and $T_2$ are each H, Cl, Br, F, $C_1$-$C_4$-alkyl, $C_1$-$C_4$-alkoxy, phenyl, phenyl substituted by Cl, $CH_3$, $C_2H_5$, $OCH_3$ or $OC_2H_5$ or phenoxy or phenoxy substituted by Cl, $CH_3$, $C_2H_5$, $OCH_3$ or $OC_2H_5$; B is —CH=$CH_2$ or —$CH_2CH_2$—Z wherein Z is $OSO_3H$, Cl, $S_2O_3H_2$, $OCOCH_3$, $OPO_3H_2$ or $N^{(+)}(CH_3)_3$; X is O, S or NR wherein R is H, $C_1$-$C_4$-alkyl or $C_1$-$C_4$-alkyl substituted by OH, $OCH_3$, COOH or $SO_3H$; Y is a direct bond or a $C_1$-$C_6$-alkylene which is optionally substituted and/or interrupted by heteroatoms,
$X_2$ is a direct bond, or phenylene or phenylene substituted by $SO_3H$, Cl, $OCH_3$, $CH_3$, $C_2H_5$ or $NH_2$,
or an araliphatic radical and the $SO_2B$ group is in the o-position relative to the substituent —X—Y—$X_2$—$SO_3H$.

6. A triphendioxazine dyestuff of the formula

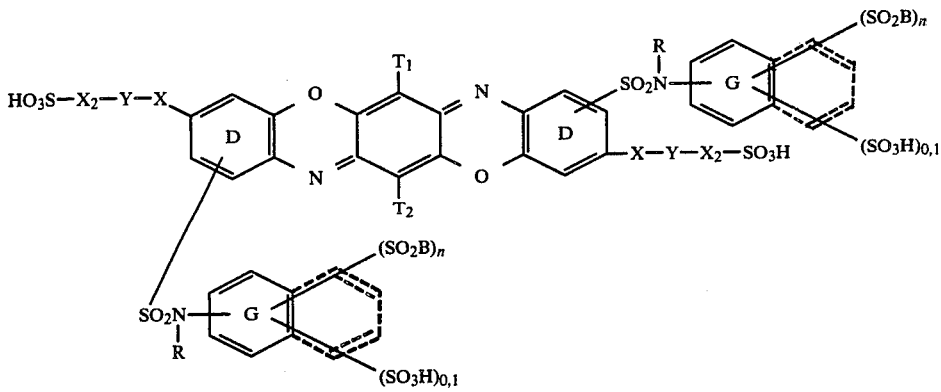

wherein the benzene rings D may be further substituted by Cl, Br, $CH_3$, $C_2H_5$, $OCH_3$, $OC_2H_5$ or COOH; $T_1$ and $T_2$ are each H, Cl, Br, F, $C_1$-$C_4$-alkyl, $C_1$-$C_4$-alkoxy, phenyl, phenyl substituted by Cl, $CH_3$ or $C_2H_5$ or phenoxy or phenoxy substituted by Cl, $CH_3$, $C_2H_5$, $OCH_3$ or $OC_2H_5$; B is —CH=$CH_2$ or —$CH_2CH_2$—Z wherein Z is $OSO_3H$, Cl, $S_2O_3H_2$, $OCOCH_3$, $OPO_3H_2$ or $N^{(+)}(CH_3)_3$; X is O, S or NR wherein R is H, $C_1$-$C_4$-alkyl or $C_1$-$C_4$-alkyl substituted by OH, $OCH_3$, COOH or $SO_3H$; Y is a direct bond or a $C_1$-$C_6$-alkylene which is substituted and/or interrupted by heteroatoms; $X_2$ is a direct bond, phenylene, phenylene substituted by $SO_3H$, Cl, $OCH_3$, $CH_3$, $C_2H_5$ or $NH_2$ or an araliphatic radical; n is 1, and the benzene or naphthalene ring G can be substituted by Cl, $CH_3$, $OCH_3$, or $OC_2H_5$ and wherein the group

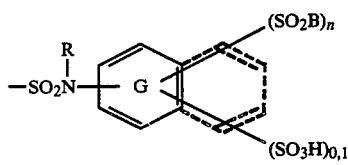

is in the o-position relative to the substitutent —X—Y—$X_2$—$SO_3H$.

7. A triphendioxazine dyestuff of the formula

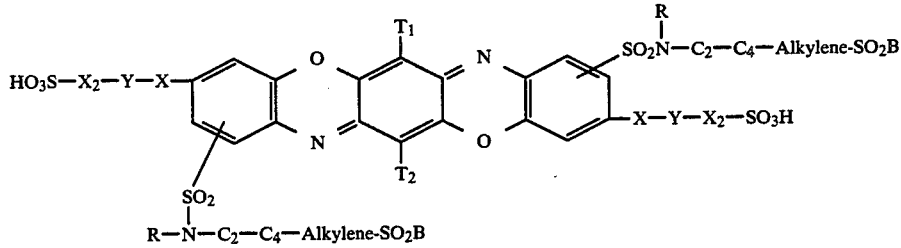

wherein
$T_1$ and $T_2$ are each H, Cl, Br, F, $C_1$-$C_4$-alkyl, $C_1$-$C_4$-alkoxy, phenyl, phenyl substituted by Cl, $CH_3$, $C_2H_5$, $OCH_3$ or $OC_2H_5$ or phenoxy or phenoxy substituted by Cl, $CH_3$, $C_2H_5$, $OCH_3$ or $OC_2H_5$; B is —CH=$CH_2$ or —$CH_2CH_2$—Z wherein Z is $OSO_3H$, Cl, $S_2O_3H_2$, $OCOCH_3$, $OPO_3H$ or $N^{(+)}(CH_3)_3$, X is O, S or NR wherein R is H, $C_1$-$C_4$-alkyl, or $C_1$-$C_4$-alkyl substituted by OH, $OCH_3$, COOH or $SO_3H$, Y is a direct bond or a $C_1$-$C_6$-alkylene which is optionally substituted and/or interrupted by heteroatoms; $X_2$ is a direct bond, phenylene, phenylene substituted by $SO_3H$, Cl, $OCH_3$, $CH_3$, $C_2H_5$ or $NH_2$ or an araliphatic radical.

8. A triphendioxazine dyestuff according to claim 1, in which
B is $CH_2CH_2OSO_3H$,
$T_1$ and $T_2$ are each Cl
X is NH.

9. A dyestuff of the formula

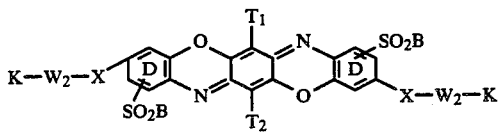

wherein the benzene rings D may be further substituted by Cl, Br, $CH_3$, $C_2H_5$, $OCH_3$, $OC_2H_5$ or COOH, $T_1$ and $T_2$ are each H, Cl, Br, F, $C_1$-$C_4$-alkyl, $C_1$-$C_4$ alkoxy, phenyl, phenyl substituted by Cl, $CH_3$, $C_2H_5$, $OCH_3$ or $OC_2H_5$ or phenoxy or phenoxy substituted by Cl, $CH_3$, $C_2H_5$, $OCH_3$ or $OC_2H_5$, wherein the group —$SO_2B$ is in the o-position relative to the group —X—$W_2$—K and,

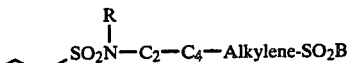

wherein K is —COOH or —$SO_2NHSO_2R_1$ in which $R_1$ is methyl or phenyl, B is CH=$CH_2$ or $CH_2CH_2Z$, said Z being $OSO_3H$, Cl, $S_2O_3H_2$, $OCOCH_3$, $OPO_3H_2$ or $N^{(+)}(CH_3)_3$; X is O, NR, or S in which R is H, $C_1$-$C_4$-alkyl, $C_1$-$C_4$-alkyl substituted by OH, $OCH_3$, COOH or $SO_3H$; and $W_2$ is an aliphatic, araliphatic or aromatically carboxyclic bridge member.

10. Triphendioxazine dyestuffs of claim 2 in which X is NH.

UNITED STATES PATENT AND TRADEMARK OFFICE
CERTIFICATE OF CORRECTION

PATENT NO. : 4,629,788
DATED : December 16, 1986
INVENTOR(S) : Horst Jäger

Page 1 of 3

It is certified that error appears in the above-identified patent and that said Letters Patent is hereby corrected as shown below:

| | |
|---|---|
| Col. 2, line 60 | Add "ξ" as follows 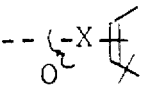 |
| Col. 3, line 5 | Delete "$R^1_1$" and substitute --R'-- |
| Col. 3, line 39 | Delete "$R^1$" and substitute --$R_1'$-- |
| Cols. 3-4, line 35 | Delete "⌄ with $T_a$" and substitute -- ⌄ with $T_2$ -- |
| Col. 4, line 6 | Before "rings" delete "napthalalene" and substitute --napthalene-- |
| Col. 6, last line | Delete "$-(CH_2)\frac{-}{2}$" and substitute -- $-(CH_2)\overline{2-6}$ -- |
| Col. 8, line 32 | After "$X_2$=direct bond and" delete "Y= $-CH_2-CH_{13}$ or" and substitute --Y= $-CH_2-CH_2-$ or -- |
| Col. 8, line 35 | Delete "$SO_2H$" two instances and substitute --$SO_3H$-- two instances |
| Col. 9, (Formula 7a) | After "$BSO_2-$" delete "$Y_2$" and substitute --$Y_1$-- |
| Col. 11, last line | Bottom of formula (11) delete "$SO_2H$" and substitute --$SO_3H$-- |
| Col. 12, line 20 | End of formula (12) delete "$-(SO_2H)_n$" and substitute ---$(SO_3H)_n$-- |
| Col. 13, line 20 | End of formula delete "$-CH_2$" and substitute -- $-CH_3$ -- |

UNITED STATES PATENT AND TRADEMARK OFFICE
CERTIFICATE OF CORRECTION

PATENT NO. : 4,629,788
DATED : December 16, 1986
INVENTOR(S) : Horst Jäger

Page 2 of 3

It is certified that error appears in the above-identified patent and that said Letters Patent is hereby corrected as shown below:

| | |
|---|---|
| Col. 16, line 19 | Above "$CH_3$" delete "$-NCHCH_2CH-$" and substitute -- $-NHCH_2\underset{\|}{C}H-$ -- |
| Col. 18, line 33 | Bottom of second structure from end of formula delete "$SO_2H$" and substitute --$SO_3H$-- |
| Col. 21, line 44 | Before "has" delete "dye-stuff" and substitute --dyestuff-- |
| Col. 32, line 2 | Before "3a" delete "or" and substitute --and-- |
| Col. 35, line 15 | After "represents" delete "$SO_2CH_2CHhd_2OSO_3H$" and substitute --$SO_2CH_2CH_2OSO_3H$-- |
| Col. 35, line 34 | Delete "(1)" and substitute --(I)-- |
| Col. 37, line 55 | After "1" insert --,-- |

UNITED STATES PATENT AND TRADEMARK OFFICE
CERTIFICATE OF CORRECTION

PATENT NO. : 4,629,788
DATED : December 16, 1986                               Page 3 of 3
INVENTOR(S) : Horst Jäger It is certified that error appears in the above-identified patent and that said Letters Patent is hereby corrected as shown below:

Col. 36, line 41    Delete "$C_2$-$C_6$-alkylene-(O)-$SO_3$H
                                        0 or 1"

and substitute

--$C_2$-$C_6$-alkylene-$(O)_{0 \text{ or } 1}$-$SO_3$H--

Col. 40, line 65    After "aromatically" delete "carboxyclic" and substitute --carbocyclic--

Signed and Sealed this

Thirtieth Day of August, 1988

Attest:

DONALD J. QUIGG

*Attesting Officer*            *Commissioner of Patents and Trademarks*